US011979786B2

(12) United States Patent
Devlic

(10) Patent No.: US 11,979,786 B2
(45) Date of Patent: May 7, 2024

(54) NETWORK NODES FOR JOINT MEC HOST AND UPF SELECTION

(71) Applicant: HUAWEI TECHNOLOGIES CO., LTD., Guangdong (CN)

(72) Inventor: Alisa Devlic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 17/533,889

(22) Filed: Nov. 23, 2021

(65) Prior Publication Data
US 2022/0086719 A1    Mar. 17, 2022

Related U.S. Application Data

(63) Continuation of application No. PCT/EP2019/063635, filed on May 27, 2019.

(51) Int. Cl.
*H04W 36/08* (2009.01)
*H04W 36/00* (2009.01)
*H04W 36/22* (2009.01)

(52) U.S. Cl.
CPC ..... *H04W 36/08* (2013.01); *H04W 36/00835* (2018.08); *H04W 36/00837* (2018.08); *H04W 36/22* (2013.01)

(58) Field of Classification Search
CPC ........... H04W 36/08; H04W 36/00837; H04W 36/00835; H04W 36/22
USPC .................................. 370/310, 328, 329, 331
See application file for complete search history.

(56) References Cited

U.S. PATENT DOCUMENTS

| 2017/0288972 | A1  | 10/2017 | Li et al. |
| 2018/0192471 | A1  | 7/2018  | Li et al. |
| 2019/0104030 | A1* | 4/2019  | Giust ................. H04L 41/5054 |
| 2020/0053591 | A1* | 2/2020  | Prasad ............. H04W 28/0268 |

(Continued)

FOREIGN PATENT DOCUMENTS

| CN | 107770815 A | 3/2018 |
| CN | 108174421 A | 6/2018 |

(Continued)

OTHER PUBLICATIONS

Office Action issued in Chinese Application No. 201980087056.6 dated Jun. 6, 2022, 6 pages (with English translation).

(Continued)

*Primary Examiner* — Obaidul Huq
(74) *Attorney, Agent, or Firm* — Fish & Richardson P.C.

(57) ABSTRACT

In one example method, a first network node transmits a first control message, which indicates a set of candidate mobile edge computing (MEC) hosts, a client device, and network performance boundaries for selection of a MEC host, to a second network node. The first network node receives a second control message, which indicates a subset of the set of candidate MEC hosts and performance of a fastest path from the client device to each candidate MEC host in the subset of candidate MEC hosts, and probabilities of the client device entering a coverage area of the each candidate MEC host, from the second network node. The first network node transmits a third control message indicating a selected MEC host to the second network node. The second network node selects a user plane function (UPF) for traffic steering to the selected MEC host based on the third control message.

20 Claims, 9 Drawing Sheets

(56) References Cited

U.S. PATENT DOCUMENTS

| | | | | |
|---|---|---|---|---|
| 2020/0136978 A1* | 4/2020 | Li | ......................... | H04L 67/141 |
| 2020/0169857 A1* | 5/2020 | Yang | ................... | H04L 43/0858 |

FOREIGN PATENT DOCUMENTS

| | | | |
|---|---|---|---|
| CN | 109413619 A | | 3/2019 |
| CN | 109600802 A | | 4/2019 |
| WO | 2018072224 A1 | | 4/2018 |
| WO | 2018206844 A1 | | 11/2018 |
| WO | 2019061188 A1 | | 4/2019 |

OTHER PUBLICATIONS

3GPP TS 23.288 V0.4.0 (Apr. 2019), "3rd Generation Partnership Project; Technical Specification Group Services and System Aspects; Architecture enhancements for 5G System (5GS) to support network data analytics services(Release 16)," Apr. 2019, 48 pages.

3GPP TS 23.501 V16.0.2 (Apr. 2019), "3rd Generation Partnership Project; Technical Specification Group Services and System Aspects; System Architecture for the 5G System;Stage 2(Release 16)," Apr. 2019, 317 pages.

3GPP TS 23.502 V16.0.2 (Apr. 2019), "3rd Generation Partnership Project; Technical Specification Group Services and System Aspects; Procedures for the 5G System;Stage 2(Release 16)," Apr. 2019, 419 pages.

3GPP TR 23.725 V16.1.0 (Mar. 2019), "3rd Generation Partnership Project; Technical Specification Group Services and System Aspects; Study on enhancement of Ultra-Reliable Low-Latency Communication (URLLC) support in the 5G Core network (5GC)(Release 16)," Mar. 2019, 91 pages.

3GPP TR 23.791 V16.1.0 (Mar. 2019), "3rd Generation Partnership Project; Technical Specification Group Services and System Aspects; Study of Enablers for Network Automation for 5G(Release 16)," Mar. 2019, 124 pages.

China Mobile et al., "Discussion about 3GPP Rel-17 eNA phase 2," SA WG2 Meeting #132, S2-1903098, Xi'An, China, Apr. 8-15, 2019, 11 pages.

ETSI GS MEC 012 V1.1.1 (Jul. 2017), "Mobile Edge Computing (MEC); Radio Network Information API," Jul. 2017, 57 pages.

Huawei et al., "New SID: Study on enhancement of support for Edge Computing in 5GC," SA WG2 Meeting #S2-131, S2-1902931, Santa Cruz, Tenerife, Feb. 25-Mar. 1, 2019, 4 pages.

Kekki et al., "MEC in 5G networks," ETSI White Paper No. 28, First edition, Jun. 2018, 28 pages.

PCT International Search Report and Written Opinion issued in International Application No. PCT/EP2019/063635 dated Jan. 27, 2020, 17 pages.

Office Action issued in Chinese Application No. 201980087056.6 dated Dec. 22, 2021, 7 pages.

\* cited by examiner

NETWORK NODES FOR JOINT MEC HOST AND UPF SELECTION

CROSS-REFERENCE TO RELATED APPLICATIONS

This application is a continuation of International Application No. PCT/EP2019/063635, filed on May 27, 2019. The disclosure of which is hereby incorporated by reference in its entirety.

TECHNICAL FIELD

The invention relates to network nodes for joint MEC host and UPF selection in wireless communication systems. Furthermore, the invention also relates to corresponding methods and computer program.

BACKGROUND

Applications of new generation such as tactile Internet, mobile gaming, intelligent transportation and augmented/virtual reality pose new requirements on the mobile network, especially in terms of latency. Mobile edge computing (MEC) is one of the key technologies required to support the key performance indications (KPIs) of 5G network, such as latency of 1 ms and lower. To achieve this, MEC moves the network traffic and computation resources to the edge of network and closer to consumers, i.e., to MEC hosts. This reduces network congestion and improves the application performance. MEC offers user equipment (UE) applications cloud computing capabilities, service deployment and content caching at the edge of the network. MEC environment is characterized by ultra-low latency and high bandwidth, with real-time access to radio network information. On the other hand, 5G core network (CN) has a flexible, decentralized cloud-based architecture, where user plane functions (UPFs) can be deployed in various configurations and locations. Session mobility function (SMF) from 5GC selects a UPF to serve a UE-initiated packet data unit (PDU) session based on network information such as UPF location, capacity, and load.

In case of the low latency requirement, the 5G core network selects the UPF close to UE and executes the traffic steering from the UPF to the local data network via N6 interface. The UPF has a key role in an integrated MEC deployment in the 5G network. UPFs can be seen as a distributed and configurable data plane from the MEC system perspective. In specific deployments, such as the integrated MEC deployment in the 5G network, a local UPF can be seen as part of MEC host implementation in order to meet the ultra-low latency application requirement.

SUMMARY

An objective of embodiments of the invention is to provide a solution which mitigates or solves the drawbacks and problems of conventional solutions.

The above and further objectives are solved by the subject matter of the independent claims. Further advantageous embodiments of the invention can be found in the dependent claims.

According to a first aspect of the invention, the above mentioned and other objectives are achieved with a first network node for a wireless communication system, the first network node being configured to a) determine a set of candidate mobile edge computing, MEC, hosts based on a distance from a client device to each candidate MEC host;
b) transmit a first control message to a second network node, wherein the first control message indicates the set of candidate MEC hosts, the client device, and network performance boundaries for selection of a MEC host;
c) receive a second control message from the second network node, wherein the second control message indicates a subset of the set of candidate MEC hosts and performance of the fastest path from the client device to each candidate MEC host in the subset of candidate MEC hosts, and probabilities of the client device entering a coverage area of each candidate MEC host in the subset of candidate MEC hosts;
d) select a MEC host from the subset of candidate MEC hosts based on the second control message; and
e) transmit a third control message to the second network node, wherein the third control message indicates the selected MEC host.

The distance from a client device to each candidate MEC host can be a geographic or spatial distance between the client device and each MEC host.

That the first control message indicates the set of candidate MEC hosts and the client device can be understood to mean that e.g. the Identity (ID) of said candidate MEC hosts and the client device are indicated.

The fastest path from each candidate MEC host to the client device can herein be interpreted as the fastest path from a UPF collocated with each candidate MEC host to the client device.

An advantage of the first network node according to the first aspect is that the first network node is able to select an optimal MEC host in collaboration with the second network node (e.g. part of the 5G core network control plane) that can meet the application requested performance requirements by taking into account key parameters, such as network performance, client device mobility and MEC host computation resources. Further, since the first network node signals to the second network node the selected MEC host the second network node can select the appropriate UPF that is collocated with the selected MEC host in order to enable an application low latency performance.

In an implementation form of a first network node according to the first aspect, the first network node being configured to order the set of MEC hosts based on a distance from the client device to each candidate MEC host in the set of MEC hosts so as to obtain an ordered set of candidate MEC hosts, and wherein the first control message indicates the ordered set of candidate MEC hosts.

An advantage with this implementation form is that the first network node performs preselection and ranking of candidate MEC hosts from all the available MEC hosts based on their distance from the client device, thus reducing the number of the considered candidates to only those that fulfil the distance criteria.

In an implementation form of a first network node according to the first aspect, the first network node being configured to perform steps a) to e) upon obtaining an application performance request associated with the client device and extracting from the application performance request at least one of the network performance boundaries and computational.

Hence, the application performance request can act as a starting trigger for initiating the present procedure.

In an implementation form of a first network node according to the first aspect, the first network node being configured to:

collect from a virtualized infrastructure manager, VIM, computation resource measurements of each candidate MEC host in the subset of candidate MEC hosts;

select the MEC host from the subset of candidate MEC hosts further based on the collected computation resource measurements of each candidate MEC host in the subset of candidate MEC hosts and the computational performance boundaries.

An advantage with this implementation form is that both network performance and MEC host computational resources are considered in selection of the "optimal" MEC host and the collocated UPF, compared to using different information criteria for independent selection of MEC host and UPF as it is done in conventional solution.

In an implementation form of a first network node according to the first aspect, select a MEC host from the ordered subset of candidate MEC hosts further comprises:

select the MEC host from the subset of candidate MEC hosts according to a selection algorithm, wherein the selection algorithm comprises one or more optimization functions subject to one or more constraints.

That a MEC host is selected from the subset of candidate MEC hosts according to a selection algorithm can understood to mean that the rules of the selection algorithm are followed so as to select the optimal MEC host.

An advantage with this implementation form is that the selection algorithm is flexible and can be based on different criteria that can be determined based on the application's performance request, i.e., if it is latency-sensitive, throughput-sensitive, load-sensitive, etc., and the current variable values (such as predicted mobility, network performance, and MEC host computational resources). The selection algorithm can also use different networking and cloud computing constraints that are extracted and derived from the application's performance request in order to meet the application's performance requirements.

In an implementation form of a first network node according to the first aspect, the one or more optimization functions are one or more of:

maximizing load balancing among the subset of candidate MEC hosts, maximizing probability of the client device entering a coverage area of each candidate MEC host in the subset of MEC hosts, minimizing distance between the client device and each candidate MEC host in the subset of MEC hosts, and minimizing round trip time between the client device and each candidate MEC hosts in the subset of MEC hosts.

Hence, the optimization functions can relate to maximizing and/or minimizing of certain performance metrics.

An advantage with this implementation form is the flexibility of defining one or more optimization's objectives that can capture the application's performance requirements.

In an implementation form of a first network node according to the first aspect, the one or more constraints are any of: network resources, network performance, computational resources of the candidate MEC hosts, load balancing among the candidate MEC hosts, mobility of the client device and location of the client device.

The mobility of the client device can in one example be a predicated mobility.

An advantage with this implementation form is that relevant constraints according to the application's performance request are considered for making an optimal selection of MEC host.

In an implementation form of a first network node according to the first aspect, the first network node being configured to perform steps a) to e) so as to select a new MEC host upon reception of a reselection trigger.

An advantage with this implementation form is that the present solution can at any time reselect a new optimal MEC host upon a network performance, MEC host computational resources, client device mobility, or application performance change, as defined by the corresponding reselection triggers. Thereby, enabling an application low latency performance.

In an implementation form of a first network node according to the first aspect, the reselection trigger is one or more of: mobility of the client device, MEC host overload, network congestion, and perceived application performance.

The perceived application performance can be seen as performance as would be perceived by a user of the client device or measured by the application running on the client device.

An advantage with this implementation form is that these reselection triggers have been defined to determine when the currently selected MEC host is no longer optimal due to the situation change, and to trigger the selection of a new optimal MEC host. Thereby, enabling an application low latency performance.

In an implementation form of a first network node according to the first aspect, the network performance boundaries comprise for each candidate MEC host at least one of: upper bounds for network transmission latency and lower bounds for uplink and downlink data rate, and the computational performance boundaries comprise for each candidate MEC host at least one of: upper boundaries for computation load and lower boundaries for required computation processing.

An advantage with this implementation form is that these network and computational performance boundaries are requested by the application and applied when selecting the optimal MEC host.

In an implementation form of a first network node according to the first aspect, the first network node is a mobile edge orchestrator, MEO, and the second network node is a network data analytics function, NWDAF.

An advantage with this implementation form is that the implementation form can be implemented in a 3GPP/ETSI compliant system.

In an implementation form of a first network node according to the first aspect, the first network node is deployed in an external data network, and wherein the first control message, the second control message and the third control message are translated between the first network node and the second network node by a network exposure function, NEF.

According to this implementation form all messages between the MEO and NWDAF goes via NEF which translates parameters inside the control messages.

An advantage with this implementation form is that the implementation form can be implemented in a 3GPP/ETSI compliant system.

According to a second aspect of the invention, the above mentioned and other objectives are achieved with a second network node for a wireless communication system, the second network node being configured to:

receive a first control message from a first network node, wherein the first control message indicates a set of candidate MEC hosts, a client device, and network performance boundaries for selection of a MEC host;

filter the set of candidate MEC hosts based on the network performance boundaries so as to obtain a subset of candidate MEC hosts;

estimate a performance of the fastest path from the client device to each candidate MEC host in the subset of MEC hosts, and probabilities of the client device entering a coverage area of each candidate MEC host in the subset of MEC hosts;

transmit a second control message to the first network node, wherein the second control message indicates the subset of candidate MEC hosts and the performance of the fastest path from the client device to each candidate MEC host in the subset of MEC hosts, and probabilities of the client device entering a coverage area of each candidate MEC host in the subset of MEC hosts;

receive a third control message from the first network node, wherein the third control message indicates a selected MEC host from the subset of candidate MEC hosts; and select a user plane function, UPF, for traffic steering to the selected MEC host based on the third control message.

Filtering the set of candidate MEC hosts based on the network performance boundaries can be understood as filtering the candidate MEC hosts as the ones which fulfils the network performance boundaries.

An advantage with a second network node according to the second aspect is that it supports the first network node in optimal selection of MEC host by sending it the network performance and client predicted mobility information in order to enable the first network node to have complete information needed to select the optimal MEC host and that after receiving the selected optimal MEC host from the first network node, the second network node can select the collocated UPF for traffic steering to the target MEC application on the selected MEC host. Further, since the first network node signals to the second network node the selected MEC host the second network node can select the appropriate UPF that is collocated with the selected MEC host for reduced latency in the system.

In an implementation form of a second network node according to the second aspect, the set of candidate MEC hosts is an ordered set of candidate MEC hosts, and the second network node being configured to:

filter the ordered set of candidate MEC hosts based on the network performance boundaries so as to obtain an ordered subset of candidate MEC hosts, and wherein the second control message indicates the ordered subset of candidate MEC hosts.

An advantage with this implementation form is that the second network node filters the ordered set of candidate MEC hosts based on the network performance boundaries an ordered subset of candidate MEC hosts can be signaled to the first network node. Thereby, the first network node can improve its selection of MEC host by introducing additional information criteria in the selection process.

In an implementation form of a second network node according to the second aspect, the second network node being configured to select a UPF collocated with the selected MEC host for traffic steering to the selected MEC host based on the third control message.

To select a UPF for traffic steering to the selected MEC host can mean to select a UPF for traffic steering to a target MEC application at the selected MEC host.

In an implementation form of a second network node according to the second aspect, the network performance boundaries comprise for each candidate MEC host at least one of: upper bounds for network transmission latency and lower bounds for uplink and downlink data rate, and the computational performance boundaries comprise for each candidate MEC host at least one of: upper boundaries for computation load and lower boundaries for required computation processing.

An advantage with this implementation form is that these network and computational performance boundaries are requested by the application and applied when obtaining the subset of candidate MEC hosts.

In an implementation form of a second network node according to the second aspect, the first network node is a mobile edge orchestrator, MEO, and the second network node is a network data analytics function, NWDAF.

An advantage with this implementation form is that the implementation form can be implemented in a 3GPP/ETSI compliant system.

In an implementation form of a second network node according to the second aspect, the first network node is deployed in an external data network, and wherein the first control message, the second control message and the third control message are translated between the first network node and the second network node by a network exposure function, NEF.

An advantage with this implementation form is that the implementation form can be implemented in a 3GPP/ETSI compliant system.

According to a third aspect of the invention, the above mentioned and other objectives are achieved with a method for a first network node, the method comprises:

determining a set of candidate mobile edge computing, MEC, hosts based on a distance from a client device to each candidate MEC host;

transmitting a first control message to a second network node, wherein the first control message indicates the set of candidate MEC hosts, the client device, and network performance boundaries for selection of a MEC host;

receiving a second control message from the second network node, wherein the second control message indicates a subset of the set of candidate MEC hosts and performance of the fastest path from the client device to each candidate MEC host in the subset of candidate MEC hosts, and probabilities of the client device entering a coverage area of each candidate MEC host in the subset of candidate MEC hosts;

selecting a MEC host from the subset of candidate MEC hosts based on the second control message; and transmitting a third control message to the second network node, wherein the third control message indicates the selected MEC host.

The method according to the third aspect can be extended into implementation forms corresponding to the implementation forms of the first network node according to the first aspect. Hence, an implementation form of the method comprises the feature(s) of the corresponding implementation form of the first network node.

The advantages of the methods according to the third aspect are the same as those for the corresponding implementation forms of the first network node according to the first aspect.

According to a fourth aspect of the invention, the above mentioned and other objectives are achieved with a method for a second network node, the method comprises:

receiving a first control message from a first network node, wherein the first control message indicates a set of candidate MEC hosts, a client device, and network performance boundaries for selection of a MEC host;

filtering the set of candidate MEC hosts based on the network performance boundaries so as to obtain a subset of candidate MEC hosts;

estimating a performance of the fastest path from the client device to each candidate MEC host in the subset of MEC hosts, and probabilities of the client device entering a coverage area of each candidate MEC host in the subset of MEC hosts;

transmitting a second control message to the first network node, wherein the second control message indicates the subset of candidate MEC hosts and the performance of the fastest path from the client device to each candidate MEC host in the subset of MEC hosts, and probabilities of the client device entering a coverage area of each candidate MEC host in the subset of MEC hosts;

receiving a third control message from the first network node, wherein the third control message indicates a selected MEC host from the subset of candidate MEC hosts; and selecting a user plane function, UPF, for traffic steering to the selected MEC host based on the third control message.

The method according to the fourth aspect can be extended into implementation forms corresponding to the implementation forms of the second network node according to the second aspect. Hence, an implementation form of the method comprises the feature(s) of the corresponding implementation form of the second network node.

The advantages of the methods according to the fourth aspect are the same as those for the corresponding implementation forms of the second network node according to the second aspect.

The invention also relates to a computer program, characterized in program code, which when run by at least one processor causes said at least one processor to execute any method according to embodiments of the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the invention will be apparent from the following detailed description.

BRIEF DESCRIPTION OF THE DRAWINGS

The appended drawings are intended to clarify and explain different embodiments of the invention, in which.

DETAILED DESCRIPTION

Figure 1:
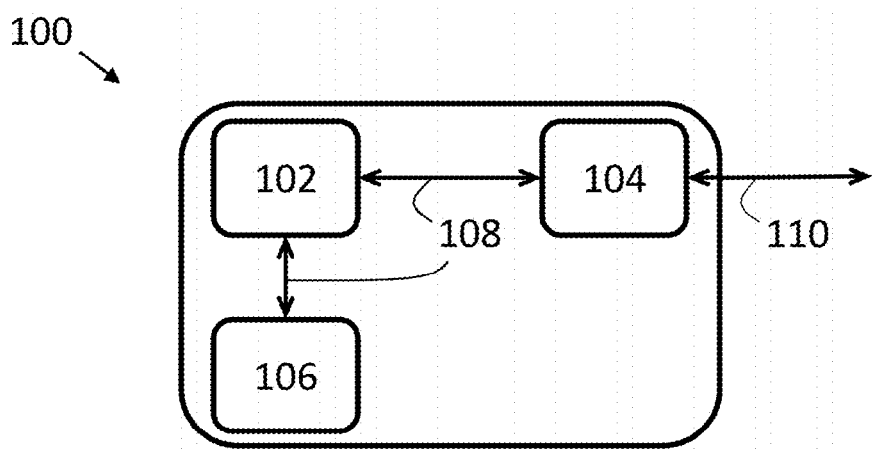
FIG. 1 shows a first network node according to an embodiment of the invention.

To support edge computing and its deployment with 5GS, some enablers have been specified since Release 15 in 3GPP TS 23.501, clause 5.13: local access to data network (LADN) by locally deployed UPF (supporting UL CL or Branching Point) utilizing local routing and traffic steering, user plane (re)selection and application function (AF) influenced traffic routing. Related enhancements are further specified in Release 16 of 5G_URLLC work item.

Currently in 3GPP there is AF's influence on traffic routing (clause 5.6.7 of TS 23.501). AF may send requests to influence the SMF routing decisions for traffic of PDU session and the AF requests may influence the UPF (re) selection to allow routing of user traffic via a local access in a Data Network identified by a DN Access Identifier (DNAI). If the operator does not allow AF to contact the network directly, the AF shall use the Network Exposure Function (NEF) to interact with the 5GC. The AF requests are sent to Policy Control Function (PCF) that transforms the AF requests into policies that apply to PDU sessions. When AF is subscribed to UP path management from SMF, it will receive direct notifications about UP path change or via NEF.

Additionally, in 3GPP there is a new use case discussed internally for Release 17 eNA working item, called Network Data Analytics Function (NWDAF)-assisted MEC. NWDAF gathers info from 5GS and MEC platform and obtains analytics on UE service behavior, i.e., application ID per region per UE group per time, and 5GS service Mean Opinion Score (MOS) per application identity (ID). Based on UE service behavior analytics and 5GS Service MOS analytics, 5GS and MEC platform can select optimized user plane path and application server for this application. However, this is only high-level idea, with no details about selection algorithm/method or interaction between 5GS and MEC platform. There still lacks understanding how to deploy edge computing with 5GS. The relationship between 5GS and application architecture of edge computing is out of scope of TS 23.501 and TS 23.502. There lacks a guidance on how to use enablers defined in clause 5.13 of TS 23.501 to support the time sensitive services, such as Vehicle-to-everything (V2X), online gaming, Augmented Reality/Virtual Reality (AR/VR).

There are different places in the 5G network where UPF can be deployed and different ways of configuration to route the incoming traffic, which can cause different application performances.

UPF selection is independent of MEC host selection in conventional solutions. The UPF selection is performed by a SMF defined by 3GPP, while the MEC host selection is performed by a mobile edge orchestrator (MEO) defined by ETSI. Hence, currently their selections are performed independently of each other and based on different information criteria. This can be a problem for application latency performance if e.g., selected UPF and MEC host are not collocated. Besides the different UPF deployments and configurations, the current selection methods of UPF and MEC host are independent of each other and based on different information criteria (networking and cloud computing parameters), thus leading to suboptimal selections of MEC host and UPF pair.

Therefore, embodiments of the invention relate a solution for joint selection of MEC host and UPF pair for improved performance compared to conventional solutions.

FIG. 1 shows a first network node 100 according to an embodiment of the invention. In the embodiment shown in FIG. 1, the first network node 100 comprises a processor 102, a transceiver 104 and a memory 106. The processor 102 is coupled to the transceiver 104 and the memory 106 by communication means 108 known in the art. The first network node 100 may be configured for wired communications in the communication systems. The wired communication capability can be provided with a wired communication interface 110 coupled to the transceiver 104. A statement in this disclosure that the first network node 100 is configured to perform certain actions can be understood to mean that the first network node 100 comprises suitable means, such as the processor 102 and the transceiver 104, configured to perform said actions.

According to embodiments of the invention the first network node 100 is configured to a) determine a set of candidate MEC hosts based on a distance from a client device 600 to each candidate MEC host. The first network node 100 is further configured to b) transmit a first control message 510 to a second network node 300. The first control message 510 indicates the set of candidate MEC hosts, the client device 600, and network performance boundaries for selection of a MEC host. The first network node 100 is further configured to c) receive a second control message 520 from the second network node 300. The second control message 520 indicates a subset of the set of candidate MEC hosts and performance of the fastest path from the client device 600 to each candidate MEC host in the subset of candidate MEC hosts, and probabilities of the client device 600 entering a coverage area of each candidate MEC host in the subset of candidate MEC hosts. The first network node 100 is further configured to d) select a MEC host from the subset of candidate MEC hosts based on the second control message 520. The first network node 100 is further configured to e) transmit a third control message 530 to the second network node 300. The third control message 530 indicates the selected MEC host.

Figure 2:
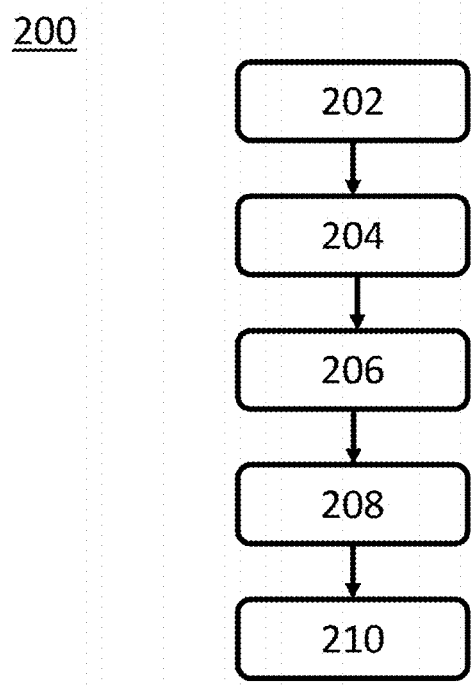
FIG. 2 shows a method for a first network node according to an embodiment of the invention.

FIG. 2 shows a flow chart of a corresponding method 200 which may be executed in a first network node 100, such as the one shown in FIG. 1. The method 200 comprises determining 202 a set of candidate MEC hosts based on a distance from a client device 600 to each candidate MEC host. The method 200 further comprises transmitting 204 a first control message 510 to a second network node 300. The first control message 510 indicates the set of candidate MEC hosts, the client device 600, and network performance boundaries for selection of a MEC host. The method 200 comprises receiving 206 a second control message 520 from the second network node 300. The second control message 520 indicates a subset of the set of candidate MEC hosts and performance of the fastest path from the client device 600 to each candidate MEC host in the subset of candidate MEC hosts, and probabilities of the client device 600 entering a coverage area of each candidate MEC host in the subset of candidate MEC hosts. The method 200 comprises selecting 208 a MEC host from the subset of candidate MEC hosts based on the second control message 520. The method 200 comprises transmitting 210 a third control message 530 to the second network node 300. The third control message 530 indicates the selected MEC host.

Figure 3:
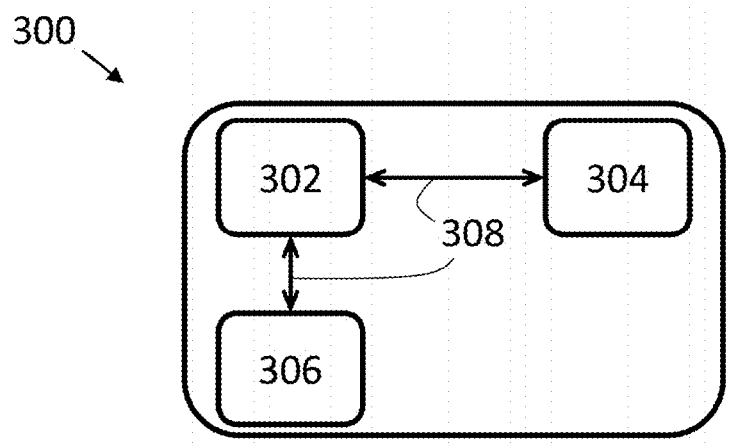
FIG. 3 shows a second network node according to an embodiment of the invention.

FIG. 3 shows a second network node 300 according to an embodiment of the invention. In the embodiment shown in FIG. 3, the second network node 300 comprises a processor 302, a transceiver 304 and a memory 306. The processor 302 is coupled to the transceiver 304 and the memory 306 by communication means 308 known in the art. A statement that the second network node 300 is configured to perform certain actions can in this disclosure be understood to mean that the second network node 300 comprises suitable means, such as the processor 302 and the transceiver 304, configured to perform said actions.

According to embodiments of the invention the second network node 300 is configured to receive a first control message 510 from a first network node 100. The first control message 510 indicates a set of candidate MEC hosts, a client device 600, and network performance boundaries for selection of a MEC host. The second network node 300 is further configured to filter the set of candidate MEC hosts based on the network performance boundaries so as to obtain a subset of candidate MEC hosts. The second network node 300 is further configured to estimate a performance of the fastest path from the client device 600 to each candidate MEC host in the subset of MEC hosts, and probabilities of the client device 600 entering a coverage area of each candidate MEC host in the subset of MEC hosts. The second network node 300 is further configured to transmit a second control message 520 to the first network node 100. The second control message 520 indicates the subset of candidate MEC hosts and the performance of the fastest path from the client device 600 to each candidate MEC host in the subset of MEC hosts, and probabilities of the client device 600 entering a coverage area of each candidate MEC host in the subset of MEC hosts. The second network node 300 is further configured to receive a third control message 530 from the first network node 300. The third control message 530 indicates a selected MEC host from the subset of candidate MEC hosts. The second network node 300 is further configured to select a user plane function, UPF, for traffic steering to the selected MEC host based on the third control message 530.

Figure 4:
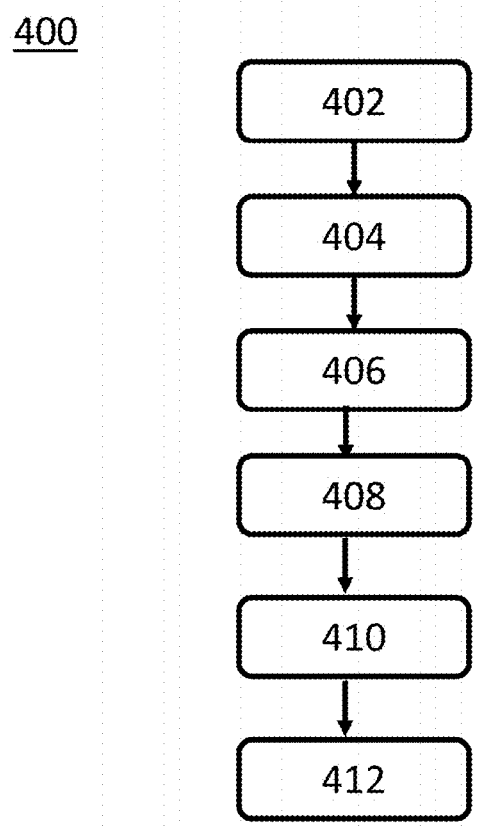
FIG. 4 shows a method for a second network node according to an embodiment of the invention.

FIG. 4 shows a flow chart of a corresponding method 400 which may be executed in a second network node 300, such as the one shown in FIG. 3. The method 400 comprises receiving 402 a first control message 510 from a first network node 100. The first control message 510 indicates a set of candidate MEC hosts, a client device 600, and network performance boundaries for selection of a MEC host. The method 400 further comprises filtering 404 the set of candidate MEC hosts based on the network performance boundaries so as to obtain a subset of candidate MEC hosts. The method 400 further comprises estimating 406 a performance of the fastest path from the client device 600 to each candidate MEC host in the subset of MEC hosts, and probabilities of the client device 600 entering a coverage area of each candidate MEC host in the subset of MEC hosts. The method 400 further comprises transmitting 408 a second control message 520 to the first network node 100. The second control message 520 indicates the subset of candidate MEC hosts and the performance of the fastest path from the client device 600 to each candidate MEC host in the subset of MEC hosts, and probabilities of the client device 600 entering a coverage area of each candidate MEC host in the subset of MEC hosts. The method 400 further comprises receiving 410 a third control message 530 from the first network node 300. The third control message 530 indicates a selected MEC host from the subset of candidate MEC hosts. The method 400 further comprises selecting 412 a user plane function, UPF, for traffic steering to the selected MEC host based on the third control message 530.

Figure 5:
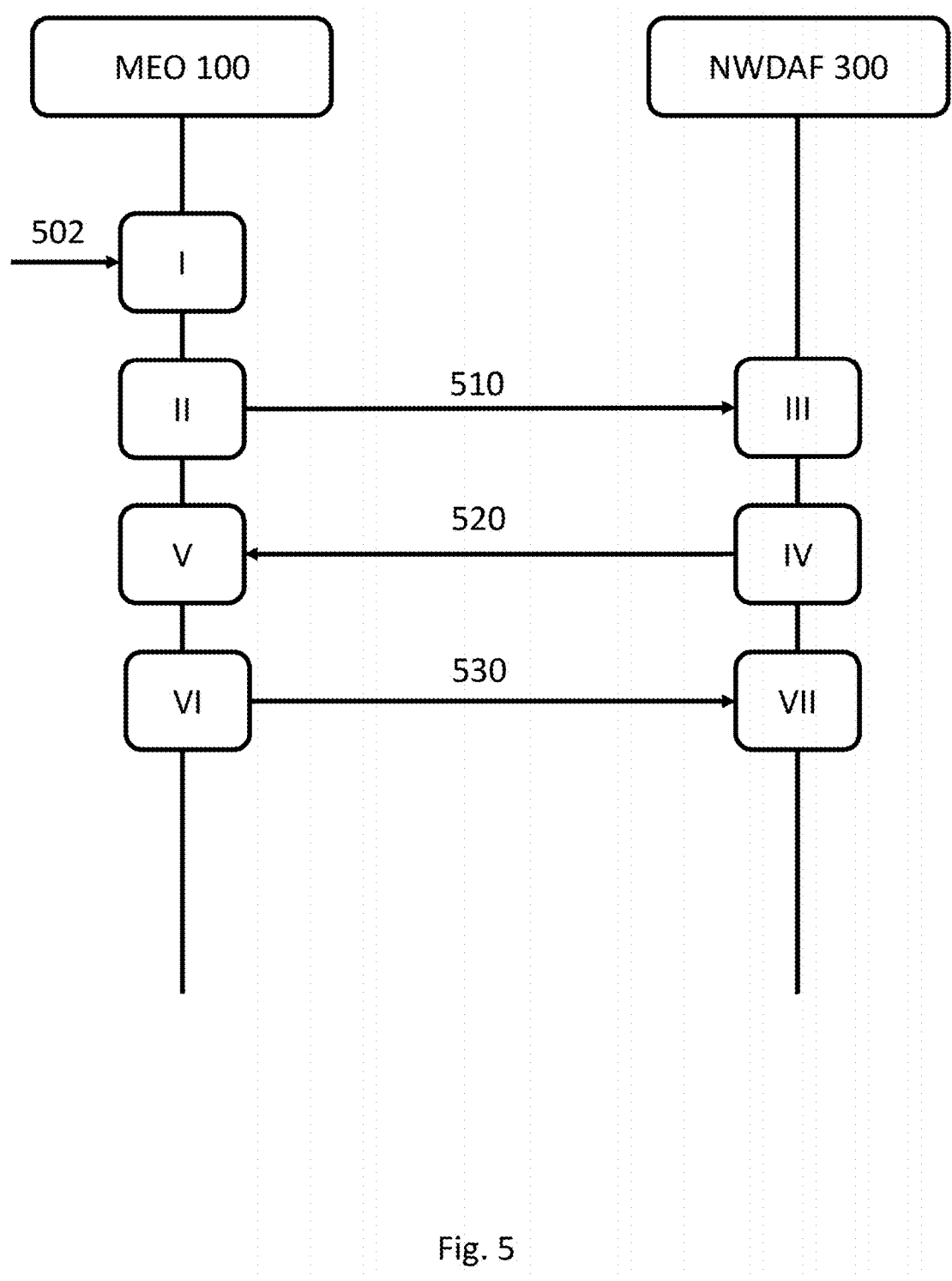
FIG. 5 shows a signalling diagram according to an embodiment of the invention.

FIG. 5 shows a more detailed embodiment of a joint MEC host and UPF selection procedure according to the invention in a wireless communication system which can be a mobile network or a mobile communication system. The embodiment is set in a 3GPP and ETSI context, hence the terminology used. Therefore, the first network node 100 corresponds to a MEO, the second network node 300 corresponds to a NWDAF and a client device 600 corresponds to a UE.

At step I in FIG. 5, the MEO 100 obtains an application performance request 502 which acts as an initiation trigger for the joint selection of a MEC host and UPF pair for a UE. This means that the MEO 100 will execute the consecutive steps according to the invention, i.e. steps a)-e), when obtaining the application performance request 502. The MEO 100 can obtain the requests to run a mobile edge application in the mobile edge system (i.e., the application performance request 502) triggered by Operations Support System (OSS), a third party (via Customer Facing Service (CFS) portal) or UE application. A request to run a mobile edge application contains performance requirements on the virtualized resources, latency, and bitrate.

The MEO 100 further extracts from the obtained application performance request 502 at least one of network performance boundaries and computational performance boundaries. The MEO 100 thereafter orders or ranks a set of candidate MEC hosts based on vicinity of a MEC host to a UE 600, e.g. primary MEC host, secondary MEC hosts, and other MEC hosts. In other words, the first network node orders the set of MEC hosts based on a distance from the UE 600 to each candidate MEC host in the set of MEC hosts so as to obtain an ordered set of candidate MEC hosts. The MEO 100 can also use further information criteria for ordering or ranking the candidate MEC hosts, such as: MEC host load, application availability, etc.

At step II in FIG. 5, the MEO 100, e.g. which can be an internal AF 5G node managed by operator or an external AF node managed by third party (when deployed in the data network external to the operator's 5G system), sends a first control message 510 to the NWDAF 300 which is a 5G node. The first control message 510 indicates the ID of the UE 600 and the ordered set of candidates MEC hosts to 5GC at the NWDAF 300 directly or via a NEF which is also a 5G node. The first control message 510 further indicates network performance boundaries for selection of a MEC host extracted from the application performance request 502. The network performance boundaries comprise for each candidate MEC host at least one of:

Upper bounds for network transmission latency, i.e. $L_{max} - L_{pi}$, where $L_{max}$ denotes maximum latency between UE and candidate MEC host, $L_p$ processing latency of candidate MEC host, and i=1, . . . , N the index of the candidate MEC host; and Lower bounds for uplink and downlink data rate, i.e. $B_{UL\_min}$, $B_{DL\_min}$.

At step III in FIG. 5, the NWDAF 300 upon reception of the first control message 510 filters the set of candidate MEC hosts based on the network performance boundaries so as to obtain a subset of candidate MEC hosts. The NWDAF 300 can in embodiments of the invention filter the ordered set of candidate MEC hosts based on the network performance boundaries so as to obtain an ordered subset candidate MEC hosts.

The NWDAF 300 after filtering estimates the performance of the fastest path from the UE 600 to each candidate MEC host in the subset of candidate MEC hosts. The NWDAF 300 also estimates the probabilities of the UE 600 entering a coverage area of each candidate MEC host in the subset of MEC host.

At step IV in FIG. 5, the NWDAF 300 sends a second control message 520 to the MEO 100. The second control message 520 indicates the subset of candidate MEC hosts (ordered or not ordered depending on the embodiment) and the estimated performance of the fastest path from the UE 600 to each candidate MEC host in the subset of MEC hosts, and estimated probabilities of the UE 600 entering a coverage area of each candidate MEC host in the subset of MEC hosts, i.e. the second control message 520 indicates:

Subset of candidate MEC hosts (ordered or not ordered depending on the embodiment);

Performances of the fastest path from the UE 600 to each candidate MEC host/UPF, i.e. $L_{ti}$, $B_{ULi}$, $B_{DLi}$, i=1, . . . , N, where $L_{ti}$, denotes transmission latency between UE and candidate MEC host; and Probabilities of the UE 600 entering the MEC area of candidate MEC hosts, i.e. $P_i$.

At step V in FIG. 5, the MEO 100 upon reception of the second control message 520 selects a MEC host from the subset of candidate MEC hosts based on performance of the fastest path from the UE 600 to each candidate MEC host in the subset of candidate MEC hosts, and probabilities of the UE 600 entering a coverage area of each candidate MEC host in the subset of candidate MEC hosts and according to a selection algorithm based on one or more optimization functions subject to one or more constraints. The MEO 100 may also at this stage collect from a virtualized infrastructure manager (VIM) computation resource measurements of each candidate MEC host in the subset of candidate MEC hosts; and hence select the MEC host from the subset of candidate MEC hosts further based on the collected computation resource measurements of each candidate MEC host in the subset of candidate MEC hosts and the computational performance boundaries.

At step VI in FIG. 5, the MEO 100 informs the NWDAF 300 about the selected MEC host from the subset of candidate MEC hosts through a third control message 530 sent from the MEO 100 to the NWDAF 300.

At step VII in FIG. 5, the NWDAF 300 receives the third control message 530 and therefrom derives the selected MEC host. Based on the selected MEC host the NWDAF 300 selects a UPF which is collocated with the selected MEC host. Hence a joint MEC host and UPF selection has been made for the UE 600. In embodiments the NWDAF 300 selects a UPF collocated with the selected MEC host for traffic steering to the target MEC application on the selected MEC host based on the third control message 530.

Furthermore, embodiments of the invention also relate to a reselection mechanism for joint reselection of a MEC host and UPF pair. In this reselection mechanism a reselection trigger is used. At the arrival of the reselection trigger the MEO 100 performs all the steps so as to select a new MEC host, i.e. steps a)-e). This also implies that the NWDAF 300 interacts with the MEO 100 as previously described and performs the steps to select a UPF collocated with the selected MEC host.

Figure 6:
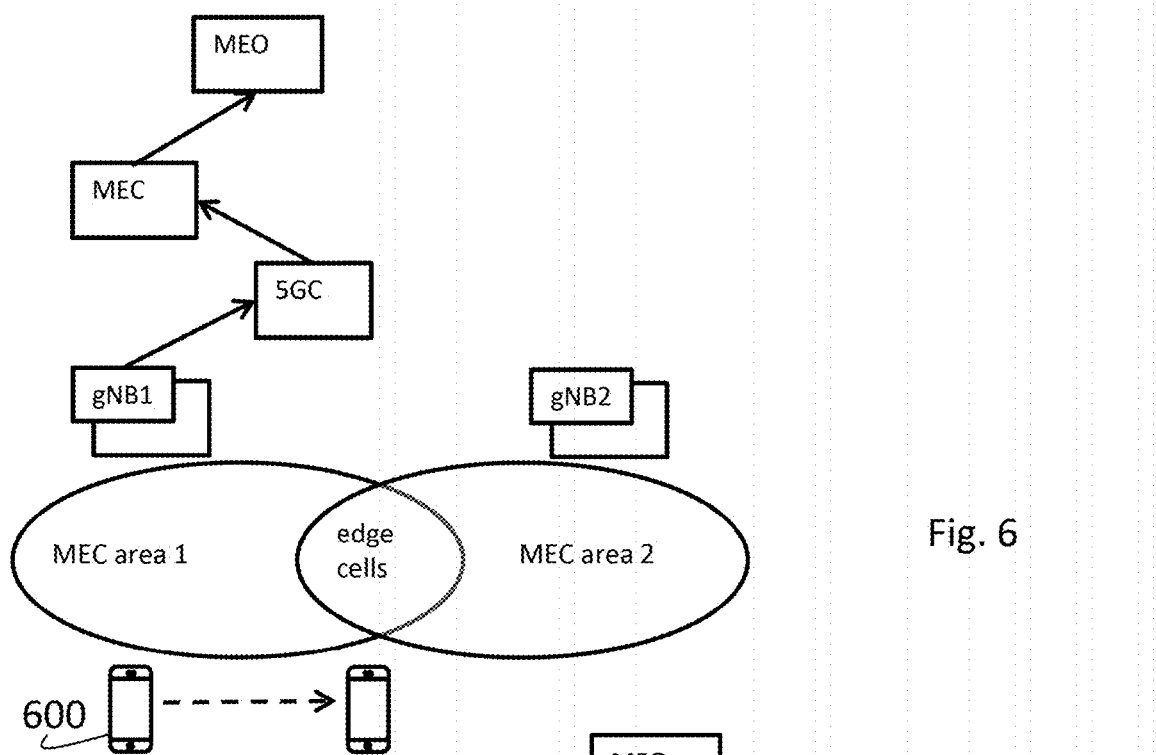
FIG. 6 illustrates client device mobility triggered reselection of MEC host and UPF.

The reselection trigger can in embodiments of the invention be due to UE mobility or application demand. FIG. 6 illustrates the UE mobility reselection trigger. Each MEC host is defined to cover one MEC area, defined by one or more NG-RAN nodes. MEC area 1 is served by gNB1 and MEC area 2 is served by gNB2. A UE 600 moves from MEC area 1 towards MEC area 2 and reaches the edge cell area. When the UE 600 enters cells at the edge of one MEC area, reselection of a new MEC host is triggered. This trigger can be detected through Radio Network Information Service (RNIS) of the MEC host or via NEF in case of external AF node and communicated to the MEO 100, which triggers the new MEC host reselection.

Figure 7:
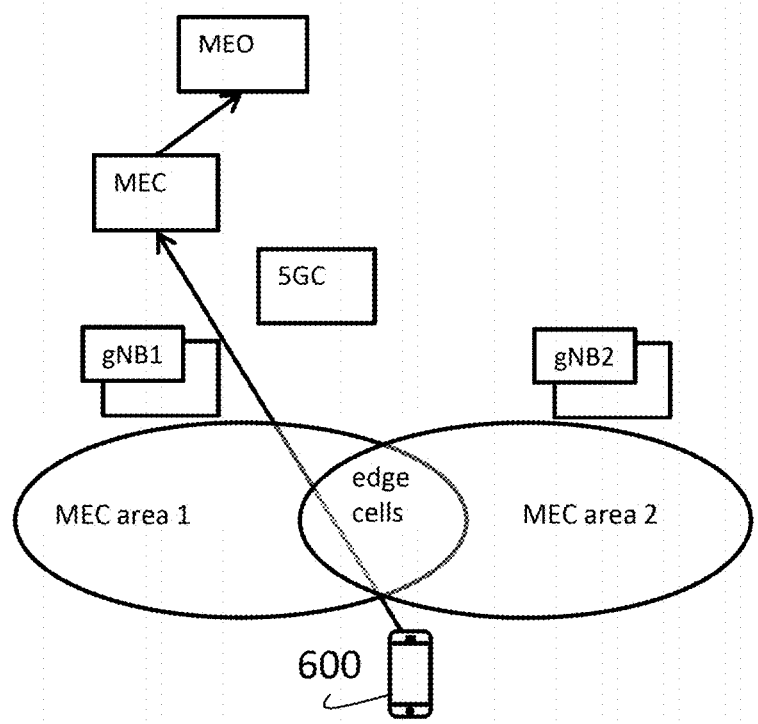
FIG. 7 illustrates application triggered reselection of MEC host and UPF.

FIG. 7 instead illustrates application performance reselection trigger. As in FIG. 6 MEC area 1 is served by gNB1 and MEC area 2 is served by gNB2. The UE 600 is in this case located close to the edge cell area and experiences bad application performance which is monitored by the UE 600 or an MEC application in the MEC host. Such performance monitoring is reported to the currently selected MEC host and reported from the currently selected MEC host to the MEO 100, which triggers a MEC host reselection procedure. Other reselection triggers which are not illustrated can include but are not limited to:

CPU overload reselection trigger which occurs when CPU load of the currently selected MEC host is too high (i.e., overloaded with other requests). This can be detected by virtualized resource monitoring in MEC platform. Such performance monitoring is reported to the MEO 100, which triggers the MEC host reselection; and Network congestion reselection trigger which happens in case of network congestion, when the network load is too high, or when latency or throughput requirements are hard to fulfill. The network congestion can be detected by virtualized performance monitoring in MEC platform, which triggers the MEC host reselection.

Figure 8:
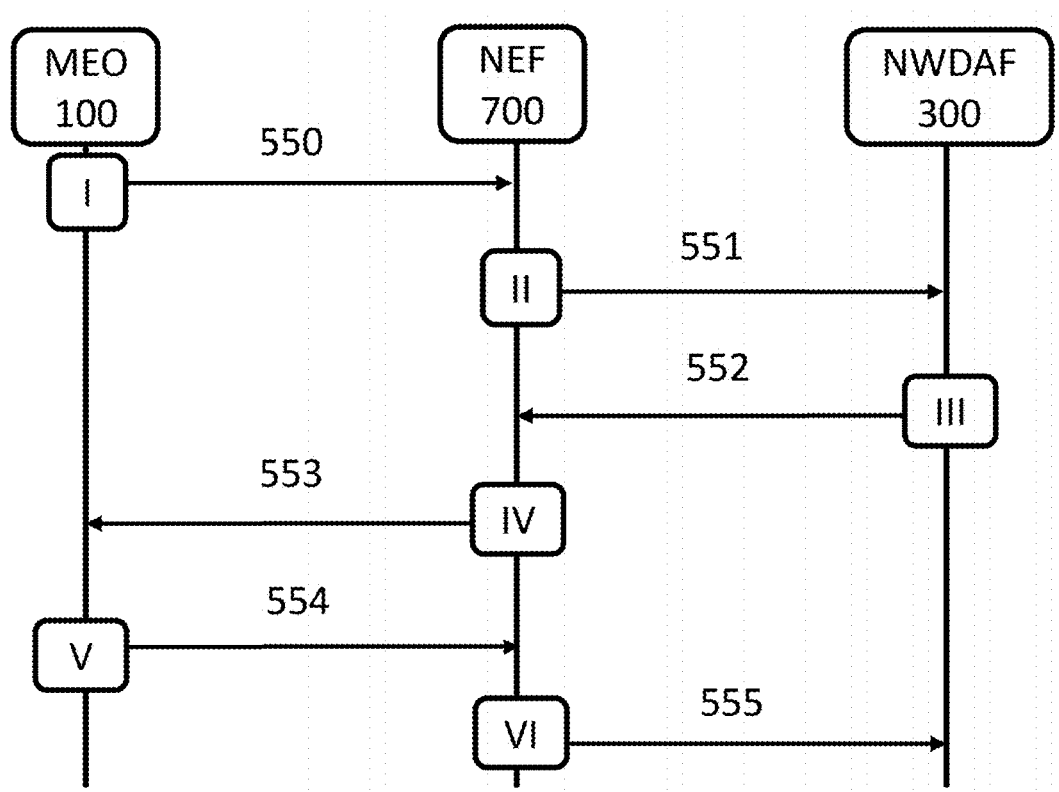
FIG. 8 shows a signalling diagram according to an embodiment of the invention.
Figure 9:
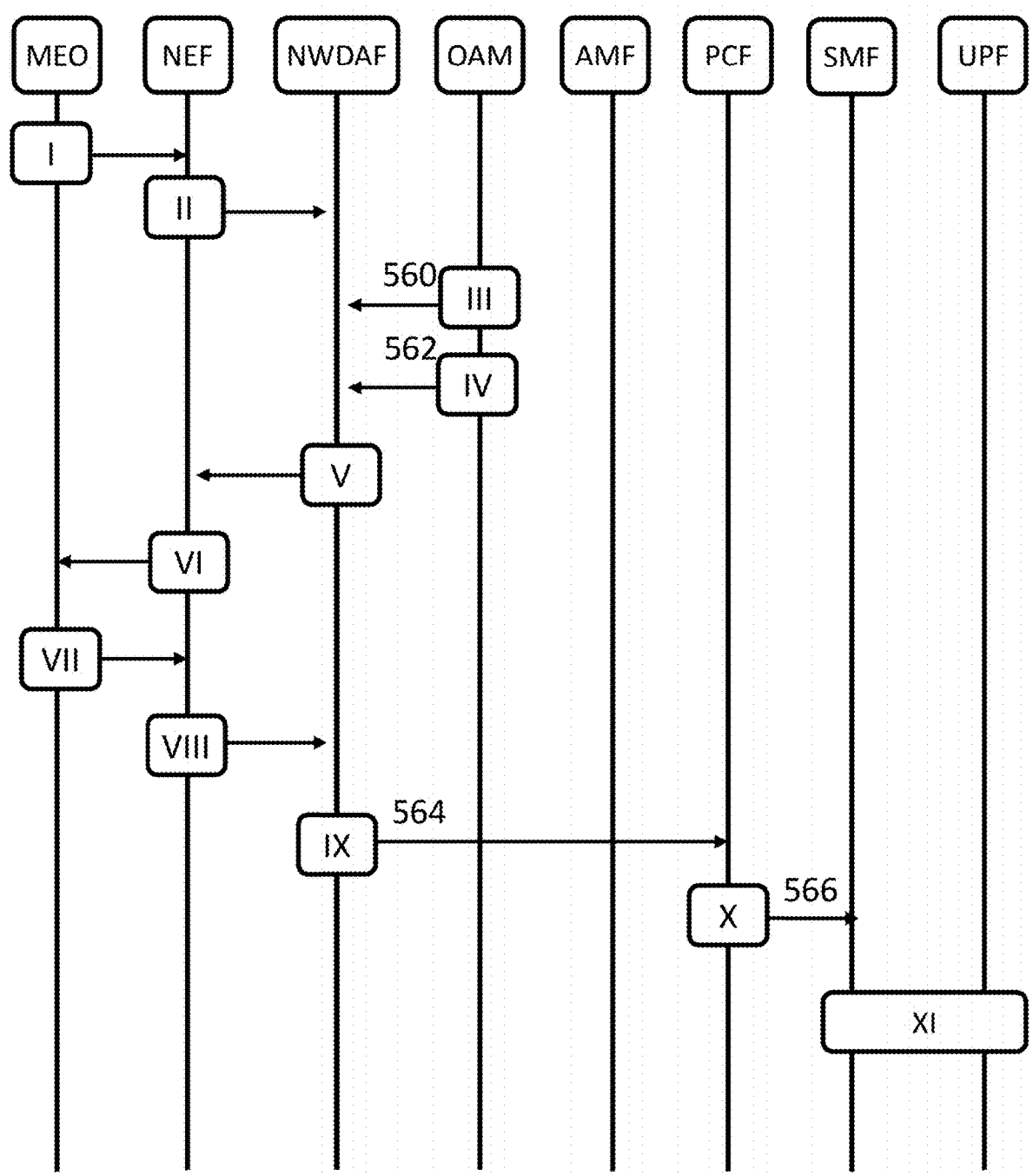
FIG. 9 shows a signalling diagram according to an embodiment of the invention.
Figure 10:
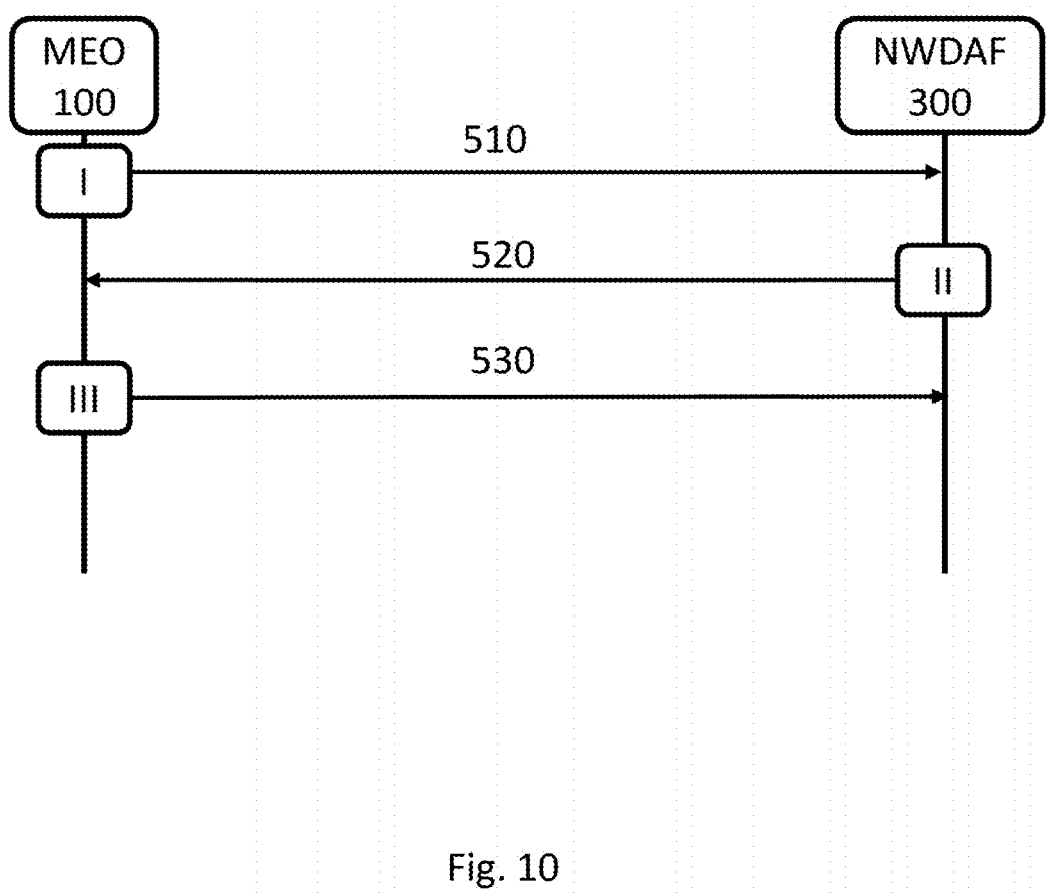
FIG. 10 shows a signalling diagram according to an embodiment of the invention.

Moreover, embodiments of the invention also relate to a novel bidirectional service based interface herein denoted Naf between the MEO and the NWDAF. The Naf can herein be understood as a notation for the service based interface that is exhibited by AF and used within the 5G control plane. Therefore, in this context the first network node 100, acting as a MEO, is deployed in an external data network, and wherein the first control message 510, the second control message 520 and the third control message 530 are translated between the MEO and the second network node 100 by NEF. The Naf interface is used to exchange intermediate results in selection of the optimal MEC host and UPF pair, i.e. for transmission of the first, second and third control messages. Two different non-limiting exemplary cases are illustrated in FIGS. 8-10. The Naf interface was also shown in FIG. 5.

Case 1 which is illustrated in FIG. 8 relates to when the MEO (AF) is an external node deployed in the data network external to the operator's 5G system and managed by 3$^{rd}$ party (such as X) and accesses the NWDAF through NEF. Therefore, the NEF acts like an intermediary 5G node that translates the MEO's requests to 5GS's requests, and vice versa. For instance, the NEF translates the AF-Service-Identifier information (i.e. identifier of the service on behalf of which the AF is issuing the request) of the ranked candidate MEC hosts into the target data network name (DNN), possibly slicing information (S-NSSAI), data network access identifier (DNAI) and routing information that will be used by SMF to select the appropriate UPF.

At step I in FIG. 8, the MEO 100 transmits a control message 550 to NEF 700. Control message 550 indicates parameters: AF-Service-Identifiers of the set of candidate MEC hosts, traffic filtering information <5-tuple> that is used by UPF to detect traffic of an application and ID of the UE 600. Individual UEs can be identified using Generic Public Subscription Identifier (GPSI)—an identifier used to address a 3GPP subscription in different data networks outside of the 3GPP system, or an IP address/Prefix or a MAC address. Control message 550 further indicates network performance boundaries for selection of a MEC host.

At step II in FIG. 8, the NEF 700 upon reception of control message 550 translates the parameter AF-Service-Identifiers of the set of candidate MEC hosts into target DNNs and slicing information (S-NSSAIs), the parameter traffic filtering information into the DNAIs and the corresponding routing information, and the parameter GPSI or IP address/prefix or a MAC address into the 5G International Mobile Subscriber Identity (IMSI)-equivalent SUbscriber Permanent Identifier (SUPI)—a globally unique string of 15 decimal digits that is associated to each subscriber in 5G system At step III in FIG. 8, the NWDAF 300 upon reception of control message 551 from the NEF 700 transmits control message 552 to the NEF 700. Control message 552 indicates a subset of candidate MEC hosts, performances of the fastest path from the UE 600 to a UPF which is collocated with a candidate MEC host for each MEC host in the subset of candidate MEC hosts, and the probabilities of the UE 600 entering a coverage area of each candidate MEC host in the subset of candidate MEC hosts.

At step IV in FIG. 8, the NEF 700 upon reception of control message 552 from the NWDAF 300 translates the parameter performances of the fastest path from the UE 600 to a UPF into the parameter performances of the fastest path from the UE 600 to the candidate MEC host that is collocated with the UPF and the parameter probabilities of the UE 600 entering coverage areas of gNodeBs that are connected to a UPF which is collocated with candidate MEC host for each MEC host in the subset of candidate MEC hosts into the parameter probabilities of the UE 600 entering a coverage area of each candidate MEC host in the subset of candidate MEC hosts.

At step V in FIG. 8, the MEO 100 upon reception of control message 553 transmits control message 554 to the NEF 700. Control message 553 indicates AF-Service-Identifier of a selected MEC host.

At step VI in FIG. 8, the NEF 700 upon reception of control message 554 translates the content of control message 553 and transmits control message 554 to NWDAF 300 translated. That is, the AF-Service-Identifier of the selected MEC host is translated into the target DNN, S-NSSAI, DNAI and the corresponding routing information.

An extension of Case 1 is illustrated in FIG. 9. The entire call flow including not only MEO, NWDAF, and NEF, but also other involved entities, such as an OAM, an AMF, a PCF and a SMF that directly or indirectly provide information to and from the NWDAF and for which the network interfaces already exist is illustrated in FIG. 9. Steps I, II, V, VI, VII and VIII in FIG. 9 corresponds to steps I, II, III, IV, V and VI in FIG. 8. Therefore, steps I, II, V, VI, VII and VIII in FIG. 9 will not be described any further and instead reference is made to the description of the corresponding steps in FIG. 8

At step III in FIG. 9, the OAM sends network performance data to the NWDAF in a control message 560. The NWDAF may collect relevant management data from the services in the OAM as configured by the Public Land Mobile Network (PLMN) operator, such as:

Next Generation (NG) RAN or 5GC performance measurements as defined in TS 28.552; and 5G end to end KPIs as defined in TS 28.554.

The interaction between the NWDAF and the OAM for data collection can be based on request/response and subscription/notification model for performance data collection, as defined in TS 23.288.

At step IV in FIG. 9, the OAM further sends UE location data to the NWDAF in a control message 562. The UE location is provided by OAM in the form of Minimization of Drive Tests, i.e. MDT data, and there are two types of MDT. For immediate MDT, measurements are performed by the UEs in CONNECTED state. The collected information is either measured directly in the network or measured in the UE and reported to the network immediately as it becomes available. For logged MDT, measurements are performed and logged by the UEs in IDLE state. The UEs may report the collected and logged information to the network at a later point of time. The UE collected measurement information during MDT may contain location information of the UE or may contain data from which location of the UE can be estimated. For example, RAN logs of immediate MDT, logs of logged MDT, and logs of problem events such as Radio Link Failure (RLF), may all contain location information or data from which UE location can be estimated.

Besides from the OAM, the NWDAF supporting user mobility statistics should also be able to receive UE mobility related information from 5GC and AFs such as: Network data related to UE mobility from 5GC is UE location information as defined in Table 6.10.2-1 (TS 23.288); and Service data related to UE mobility provided by AFs as defined in Table 6.10.2-2 (TS 23.288). Both mentioned Tables are shown below.

TABLE 6.10.2-1

UE location information collected from 5GC

| Information | Source | Description |
|---|---|---|
| UE ID | AMF | SUPI |
| UE locations (1 . . . max) | AMF | UE positions |
| >UE location | | TA or cells that the UE enters |
| >Timestamp | | A time stamp when the AMF detects the UE enters this location |

TABLE 6.10.2-2

Service Data from AF related to UE mobility

| Information | Description |
|---|---|
| UE ID | Could be GPSI or external UE ID |
| Application ID | Identifying the application providing this information UE positions |
| UE trajectory (1 . . . max) | |

At step IX in FIG. 9, the NWDAF informs the PCF of a new selected UPF collocated with the new selected MEC host through control message 564, through analyticsInfo or analyticsSubscription service that any NF or AF can use to request statistics or predictions or both. An AF, such as the NWDAF, can send requests to SMF via PCF to influence the SMF routing decisions.

At step X in FIG. 9, the PCF sends routing rules to the SMF in control message 566. The PCF transforms the AF's request for traffic steering into policies that apply to targeted PDU session(s) and provides the routing rules to the appropriate SMF as part of the Policy and Charging Control (PCC) rules.

When the PCC rules are activated, the SMF may based on local policies take the information in the PCC rules into account to:

(Re)-select UP paths (including DNAI(s)) for PDU sessions. The SMF is responsible for handling the mapping between the UE location (TAI/Cell-Id) and DNAI(s) associated with UPF and applications and the selection of the UPF(s) that serve a PDU Session;

Configure traffic steering at the UPF; and

Inform the AF of the (re)-selection of the UP path (UP path change) if information on AF subscription to corresponding SMF events has been provided in the PCC rule.

At step XI in FIG. 9, based on the received information, the SMF identifies the target UPF and initiates the configuration of the traffic rules for traffic steering there. If no applicable UPF exists, the SMF can insert one or more UPFs in the data path of the PDU session. The SMF relocates data traffic to the new selected UPF so that the selected UPF can stir the user plane traffic towards the targeted MEC applications in the data network.

Case 2 which is illustrated in FIG. 10 relates to when the MEO 100 (AF) is an internal node, i.e., deployed in the data network in the operator's 5G system, and interacts directly with NWDAF. Hence, in this case no intermediate node such as NEF is needed between the MEO 100 and the NWDAF 300 for forwarding and/or translating control messages.

At step I in FIG. 10, the MEO 100 transmits a first control message 510 to the NWDAF 300.

At step II in FIG. 10, the NWDAF 300 transmits a second control message 520 to the MEO 100 in response to the reception of the first control message 510.

At step III in FIG. 10, the MEO 100 transmits a third control message 530 to the NWDAF 300 in response to reception of the second control message 520.

Previously in this disclosure a selection algorithm for selecting a MEC host was shortly described. The selection algorithm can in embodiments of the invention be defined as an optimization problem. Variables used in the mathematical representation of the algorithm are defined in Table 1.

TABLE 1

$L_{ti}$ = transmission latency between UE and MEC host/UPF
$L_{pi}$ = processing latency of MEC host
$L_{max}$ = maximum latency between UE and MEC host/UPF
$B_{UL\_min}$ = minimum uplink data rate
$B_{DL\_min}$ = minimum downlink data rate
$D_i$ = distance between UE and MEC host
$\rho_i$ = utilization of MEC host
$\xi_{ii}$ = Jain's fairness index used to represent load balancing among MEC hosts The selection algorithm is formulated as optimization problem that aims to find the best solution from all feasible solutions. Therefore, the selection algorithm comprises of one or more optimization function(s) subject one or more constraints that can be extracted from the application performance request. An optimization function denotes a function to minimize or maximize and a constraint is a restriction applied on the optimization function. The goal of the optimization is to find the maximum or minimum value of the objective function subject to the constraints. The constraint is a condition that should be true no matter the solution to the optimization problem hence the distinction between quantities that are given, i.e. constraints, and quantities that need to be optimized, i.e., objective function.

The MEO 100 selects an optimal MEC host from the subset of candidate MEC hosts based on preferred criteria (optimization function(s)) that can be determined based on the type of application performance request, i.e., if it is latency-sensitive, load-sensitive, or throughput-sensitive, and based on the current variable values.

An objective function can be written in terms of only one variable. According to embodiments of the invention the one or more optimization functions can be any of:

Maximizing load balancing among the subset of candidate MEC hosts which can be expressed as maximize $f(x)=(\xi-\rho_1)^*x_1+(\xi-\rho_2)^*x_2+\ldots+(\xi-\rho_n)^*x_n$;

Maximizing probability of the client device (600) entering a coverage area of each candidate MEC host in the subset of MEC hosts which can be expressed as maximize $f(x)=P_1^*x_1+P_2^*x_2+\ldots+P_n^*x_n$;

Minimizing distance between the client device (600) and each candidate MEC host in the subset of MEC hosts; and Minimizing round trip time between the client device (600) and each candidate MEC hosts in the subset of MEC hosts.

The MEC host selection can be based on any (combination) of the following constraints that can be extracted from the application's performance request, i.e.: network resources, network performance, computational resources of the candidate MEC hosts, load balancing among the candidate MEC hosts, mobility of the client device 600 and location of the client device 600. Therefore, in an example the optimization functions are maximized and/or minimized subject to:

$$\sum_{i=1}^{n} x_i = 1$$

$$\sum_{i=1}^{n} P_i = 1$$

$$L_{ti} + L_{pi} \leq L_{max}$$

$$\xi = \frac{\left(\sum_{i=1}^{n} \rho_i(t)\right)^2}{|n|\sum_{i=1}^{n} \rho_i^2(t)}$$

$$D_i \leq D_{max}$$

$$B_{UL\_i} \geq B_{UL\_min}$$

$$B_{DL\_i} \geq B_{DL\_min}$$

where $x_i$ is a binary variable which can take the value "1" or "0" depending on if the candidate MEC host with index i is selected as optimal or not. The sum of all binary variables of all candidate MEC host has to be equal to 1;

$P_i$ is the probability of a client device entering the coverage area of candidate MEC host, called MEC area. The sum of probabilities of the client device entering coverage areas of all candidate MEC hosts is equal to 1;

n is the number of candidate MEC hosts;

$L_{ti}$ is the transmission latency between the client device and UPF/candidate MEC host i;

$L_{pi}$ is the processing latency between the client device and the candidate MEC host i;

$L_{max}$ is the maximum latency between the client device and the candidate MEC host/UPF i;

$\xi$ is the Jain's fairness index used to represent load balancing among the candidate MEC hosts;

$\rho_i$ is the utilization of candidate MEC host i; and $B_{UL\_i}$ and $B_{DL\_i}$ are the uplink and downlink data rates, respectively, of candidate MEC host i.

Figure 11:
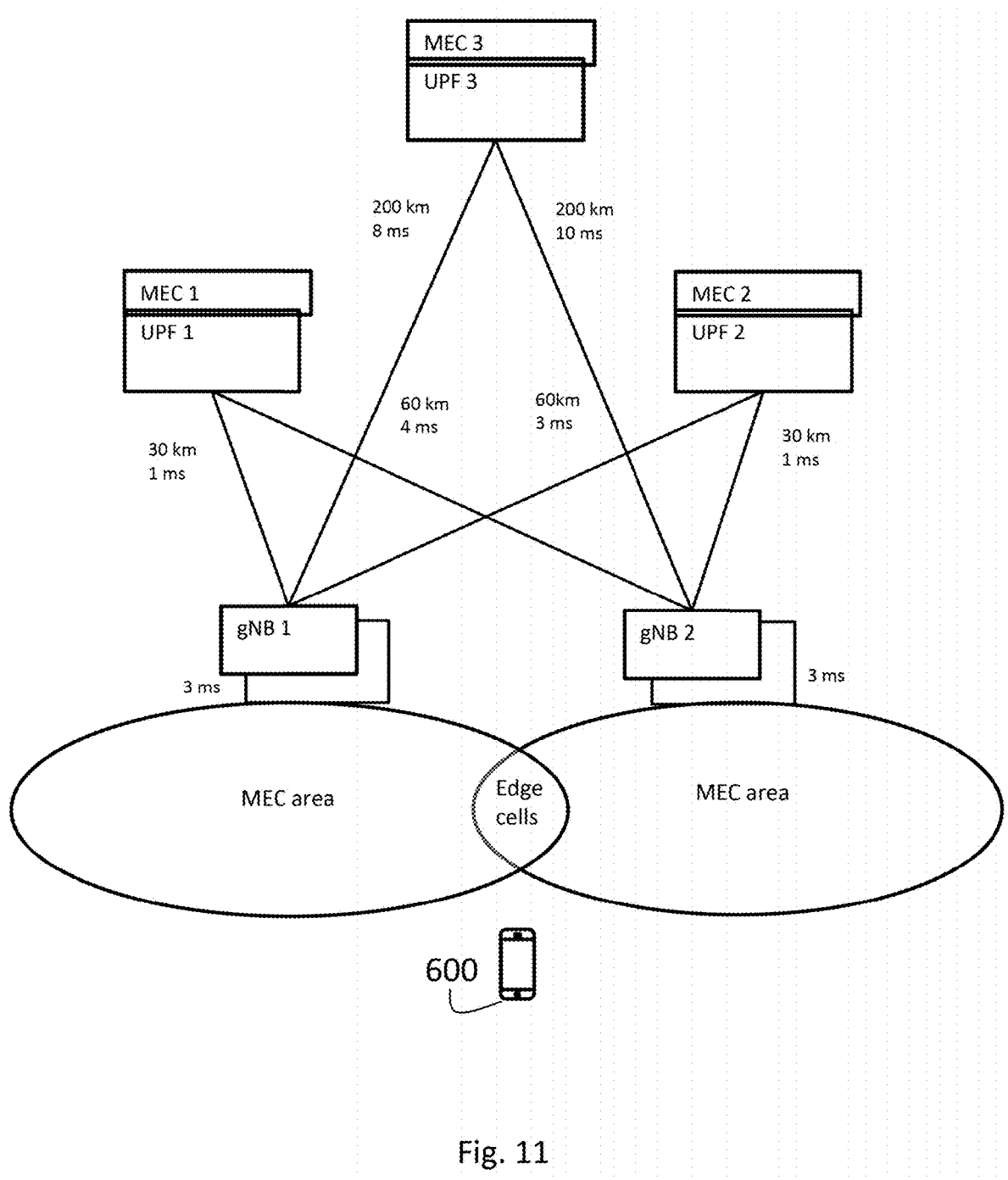
FIG. 11 illustrates two examples of use of the selection algorithm according to embodiments of the invention.

The selection algorithm herein is as previously stated solved by maximizing or minimizing the objective function and verifying that the requested quantity and/or quantities have been found. Two numerical examples that illustrate the use of the present selection algorithm are presented below with reference to FIG. 11. It is noted that the edge cells in FIG. 11 depict the overlapping area of coverage areas of two MEC hosts/gNodeBs. The goal is to select the optimal MEC host for the client device in these two examples.

Example 1 relates to streaming of video with service request: round trip latency <20 ms; DL peak bit rate 120 Mbps; UL peak bit rate 100 kbps; processing consumes 1.5 GPU for MEC host 1, 0.5 GPU for MEC host 2 and 1.8 GPU for MEC host 3. In example 1, the preferred criteria for joint selection of optimal collocated MEC host/UPF pair is maximization of load balancing and minimization of distance to MEC host. Taking these two criteria as the multi optimization objectives, the optimal MEC host and UPF pair for the UE 600 is MEC host 2 and UPF 2.

Example 2 relates to interactive photorealistic game with service request: round trip latency <5 ms; DL peak bit rate 250 Mbps; UL peak bit rate 100 kbps; processing consumes 0.5 GPU on all MEC hosts. In example 2, the preferred criteria for joint selection of optimal collocated MEC host/UPF pair is minimization of round-trip latency from UE to MEC host. Taking this criterion as the optimization objective, the optimal MEC host and UPF pair for the UE 600 is MEC host 1 and UPF1 when the UE 600 is connected to gNB1, and MEC host 2 and UPF 2 when the UE 600 is connected to gNB 2.

Figure 12:
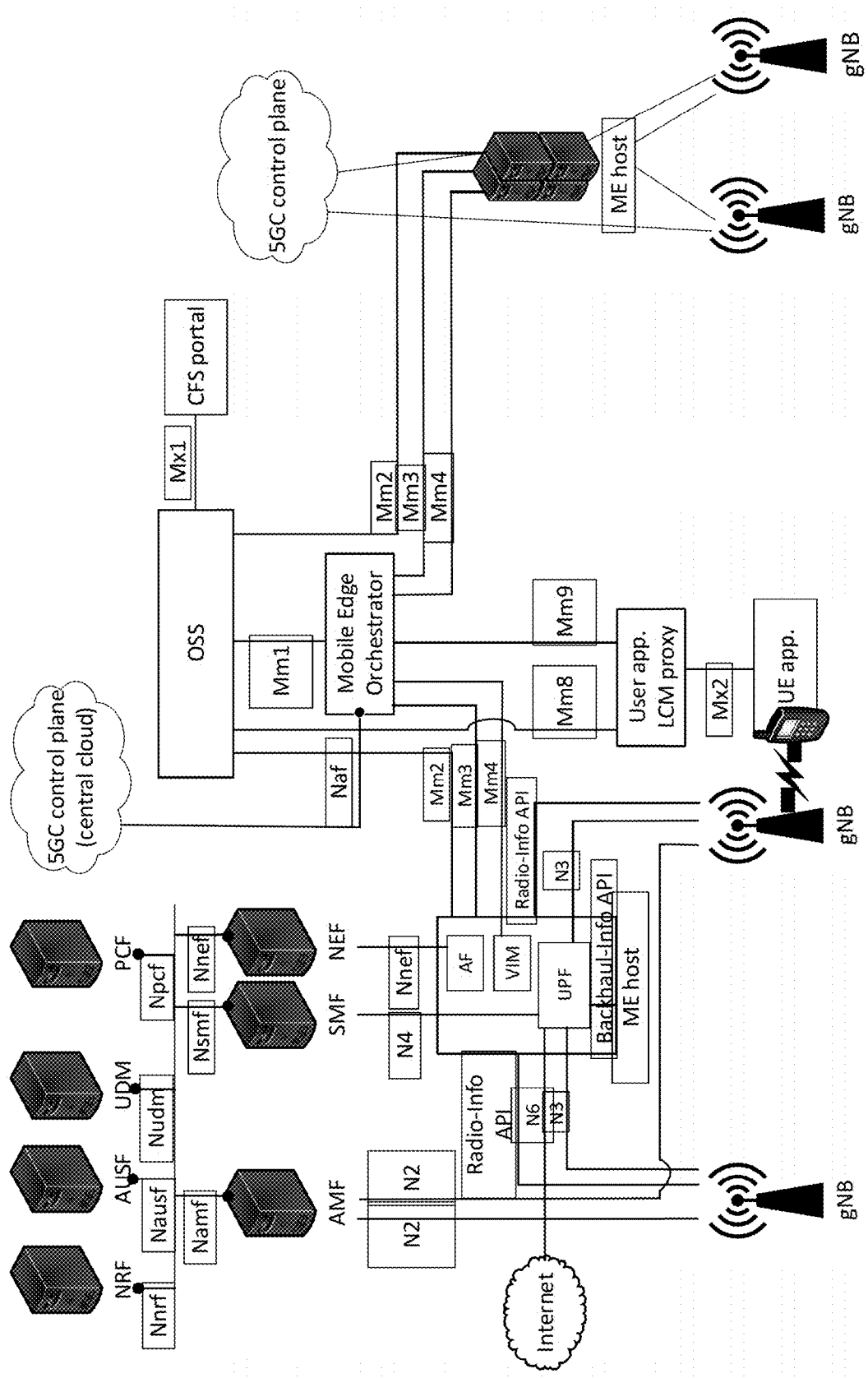
FIG. 12 illustrates an example of integration of embodiments of the invention in a 3GPP and ETSI defined system architecture.

FIG. 12 illustrates an example of how embodiments of the invention can be integrated into a MEC system, i.e., MEC application architecture defined by ETSI, together with the 5G mobile network, along with two new enhancements, i.e. the Naf interface and Backhaul-Info API indicated in FIG. 12. The MEC functional entity, referred to as MEC host (to the right in FIG. 12), is connected to several gNodeBs and has real time access to their Radio Access Network (RAN) information. RAN information is reported from each connected RAN node to MEC services via Radio-Info API, i.e., Radio Network Information Service (RNIS). It is also envisaged that gNodeBs will have real time access to Backhaul-Info API, the backhaul network information, which does not currently exist in MEC proposal, but is part of the present solution.

An MEC host can have a UPF deployed for application performance purposes and MEC service functions as part of AF. It is noted that the design approach taken by 3GPP allows the mapping of MEC entities onto AF that can use the services and information offered by other 3GPP NFs based on the configured policies. MEC host's AF can be deployed in the data network in the 5G system and managed by operator or it can be deployed outside of the data network of the 5G system and managed by $3^{rd}$ party, in which cases it can interact with 5GC CP via NEF to PCF, or via PCF directly, respectively, in order to request traffic steering.

NEF acts as a centralized point for service exposure and also has a key role in authorizing all access requests originating from outside of the 5G system. UPF can obtain backhaul network information from network management interface or generate own performance measurements, providing it to MEC host. MEC host also has Virtualized Infrastructure Manager (VIM) that is responsible for allocating and releasing virtualized compute, storage and network resources for the MEC applications. MEC hosts are connected to MEO that receives requests to run a mobile edge application in the mobile edge system triggered by Operations Support System (OSS), a third party (via Customer Facing Service (CFS) portal) or UE application. A request to run a mobile edge application contains performance requirements on the virtualized resources, latency and bitrate. In case of low latency requirement, the 5G core network selects the UPF close to UE and executes the traffic steering from the UPF to the local data network via N6 interface.

A MEO, corresponding to a first network node 100, selects the "best" MEC host in collaboration with 5GC control plane that can meet the requested performance requirements—by taking into account both network resource criteria and MEC host computing resources. The selected MEC host is signaled by the MEO to a network node in the 5GC control plane, corresponding to a second network node 100, in order to support the SMF to select appropriate UPF. This collaboration and exchange of information that is needed in selection of the "best" MEC host between MEO and 5GC occurs via the proposed Naf interface between MEO (AF) and NWDAF shown in FIG. 12.

A client device 600 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

Furthermore, any method according to embodiments of the invention may be implemented in a computer program, having code means, which when run by processing means causes the processing means to execute the steps of the method. The computer program may be stored in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first network node 100 and the second network node 300 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the first network node 100 and the second network node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

The invention claimed is:

1. A first network node for a wireless communication system, wherein the first network node comprises:
   at least one processor; and
   a memory coupled to the at least one processor and storing programming instructions for execution by the at least one processor to:
      determine a set of candidate mobile edge computing (MEC) hosts based on a distance from a client device to each candidate MEC host;
      transmit a first control message to a second network node, wherein the first control message indicates the set of candidate MEC hosts, the client device, and network performance boundaries for selection of a MEC host;
      receive a second control message from the second network node, wherein the second control message indicates a subset of the set of candidate MEC hosts and performance of a fastest path from the client device to each candidate MEC host in the subset of candidate MEC hosts, and probabilities of the client device entering a coverage area of each candidate MEC host in the subset of candidate MEC hosts;
      select a MEC host from the subset of candidate MEC hosts based on the second control message; and
      transmit a third control message to the second network node, wherein the third control message indicates the selected MEC host.

2. The first network node according to claim 1, wherein the programming instructions are for execution by the at least one processor order the set of MEC hosts based on a distance from the client device to each candidate MEC host in the set of MEC hosts to obtain an ordered set of candidate MEC hosts, and wherein the first control message indicates the ordered set of candidate MEC hosts.

3. The first network node according to claim 1,
wherein the MEC host is selected and the third control message is transmitted upon obtaining an application performance request associated with the client device and extracting from the application performance request at least one of the network performance boundaries and computational performance boundaries.

4. The first network node according to claim 3, wherein the programming instructions are for execution by the at least one processor to:
collect, from a virtualized infrastructure manager (VIM), computation resource measurements of each candidate MEC host in the subset of candidate MEC hosts; and
wherein selecting the MEC host from the subset of candidate MEC hosts is further based on the collected computation resource measurements of each candidate MEC host in the subset of candidate MEC hosts and the computational performance boundaries.

5. The first network node according to claim 3, wherein the network performance boundaries comprise for each candidate MEC host at least one of: upper bounds for network transmission latency and lower bounds for uplink and downlink data rate, and wherein the computational performance boundaries comprise for each candidate MEC host at least one of: upper boundaries for computation load and lower boundaries for required computation processing.

6. The first network node according to claim 1, wherein selecting the MEC host from the subset of candidate MEC hosts further comprises selecting the MEC host from the subset of candidate MEC hosts according to a selection algorithm, and wherein the selection algorithm comprises one or more optimization functions subject to one or more constraints.

7. The first network node according to claim 6, wherein the one or more optimization functions are one or more of:
maximizing load balancing among the subset of candidate MEC hosts;
maximizing probability of the client device entering a coverage area of each candidate MEC host in the subset of MEC hosts;
minimizing distance between the client device and each candidate MEC host in the subset of MEC hosts; and
minimizing round trip time between the client device and each candidate MEC hosts in the subset of MEC hosts.

8. The first network node according to claim 6, wherein the one or more constraints are any of: network resources, network performance, computational resources of the candidate MEC hosts, load balancing among the candidate MEC hosts, mobility of the client device, and location of the client device.

9. The first network node according to claim 1, wherein a new MEC host is selected upon reception of a reselection trigger.

10. The first network node according to claim 9, wherein the reselection trigger is one or more of: mobility of the client device, MEC host overload, network congestion, and perceived application performance.

11. The first network node according to claim 1, wherein the first network node is a mobile edge orchestrator, and the second network node is a network data analytics function.

12. The first network node according to claim 11, wherein the first network node is deployed in an external data network, and wherein the first control message, the second control message, and the third control message are translated between the first network node and the second network node by a network exposure function.

13. A second network node for a wireless communication system, wherein the second network node comprises:
at least one processor; and
a memory coupled to the processor and storing programming instructions for execution by the at least one processor to:
receive a first control message from a first network node, wherein the first control message indicates a set of candidate mobile edge computing (MEC) hosts, a client device, and network performance boundaries for selection of a MEC host;
filter the set of candidate MEC hosts based on the network performance boundaries to obtain a subset of candidate MEC hosts;
estimate a performance of a fastest path from the client device to each candidate MEC host in the subset of MEC hosts, and probabilities of the client device entering a coverage area of each candidate MEC host in the subset of MEC hosts;
transmit a second control message to the first network node, wherein the second control message indicates the subset of candidate MEC hosts and the performance of the fastest path from the client device to each candidate MEC host in the subset of MEC hosts, and probabilities of the client device entering a coverage area of each candidate MEC host in the subset of MEC hosts;
receive a third control message from the first network node, wherein the third control message indicates a selected MEC host from the subset of candidate MEC hosts; and
select a user plane function (UPF) for traffic steering to the selected MEC host based on the third control message.

14. The second network node according to claim 13, wherein the set of candidate MEC hosts is an ordered set of candidate MEC hosts, wherein the programming instructions are for execution by the at least one processor to filter the ordered set of candidate MEC hosts based on the network performance boundaries to obtain an ordered subset of candidate MEC hosts, and wherein the second control message indicates the ordered subset of candidate MEC hosts.

15. The second network node according to claim 13, wherein the programming instructions are for execution by the at least one processor to select a user plane function (UPF) collocated with the selected MEC host for traffic steering to the selected MEC host based on the third control message.

16. The second network node according to claim 13, wherein the network performance boundaries comprise for each candidate MEC host at least one of: upper bounds for network transmission latency and lower bounds for uplink and downlink data rate, and wherein computational performance boundaries comprise for each candidate MEC host at least one of: upper boundaries for computation load and lower boundaries for required computation processing.

17. The second network node according to claim 13, wherein the first network node is a mobile edge orchestrator, and the second network node is a network data analytics function.

18. The second network node according to claim 17, wherein the first network node is deployed in an external data network, and wherein the first control message, the second control message, and the third control message are translated between the first network node and the second network node by a network exposure function.

19. A method for a first network node, the method comprising:
- determining a set of candidate mobile edge computing (MEC) hosts based on a distance from a client device to each candidate MEC host;
- transmitting a first control message to a second network node, wherein the first control message indicates the set of candidate MEC hosts, the client device, and network performance boundaries for selection of a MEC host;
- receiving a second control message from the second network node, wherein the second control message indicates a subset of the set of candidate MEC hosts and performance of a fastest path from the client device to each candidate MEC host in the subset of candidate MEC hosts, and probabilities of the client device entering a coverage area of each candidate MEC host in the subset of candidate MEC hosts;
- selecting a MEC host from the subset of candidate MEC hosts based on the second control message; and
- transmitting a third control message to the second network node, wherein the third control message indicates the selected MEC host.

20. The method according to claim 19, wherein the first network node is a mobile edge orchestrator, and the second network node is a network data analytics function.

* * * * *

UNITED STATES PATENT AND TRADEMARK OFFICE
CERTIFICATE OF CORRECTION

| | | |
|---|---|---|
| PATENT NO. | : 11,979,786 B2 | Page 1 of 1 |
| APPLICATION NO. | : 17/533889 | |
| DATED | : May 7, 2024 | |
| INVENTOR(S) | : Alisa Devlic | |

It is certified that error appears in the above-identified patent and that said Letters Patent is hereby corrected as shown below:

In the Claims

In Column 21, In Line 3, In Claim 2, after "processor" insert -- to --.

Signed and Sealed this
Fifth Day of November, 2024

Katherine Kelly Vidal
*Director of the United States Patent and Trademark Office*